United States Patent [19]

Katsumi et al.

[11] Patent Number: 5,029,314

[45] Date of Patent: Jul. 2, 1991

[54] IMAGE FORMATION CONDITION CONTROLLING APPARATUS BASED ON FUZZY INFERENCE

[75] Inventors: Toru Katsumi; Masanori Miyata; Hiroaki Tsuchiya, all of Yokohama; Nobuyuki Ito, Kawasaki, all of Japan

[73] Assignee: Canon Kabushiki Kaisha, Tokyo, Japan

[21] Appl. No.: 533,588

[22] Filed: Jun. 5, 1990

[30] Foreign Application Priority Data

Jun. 7, 1989 [JP] Japan .................................. 1-146445
Sep. 1, 1989 [JP] Japan .................................. 1-224657

[51] Int. Cl.[5] ........................ G03G 21/00; G06F 1/00

[52] U.S. Cl. .................................... 355/208; 355/204; 364/274.6

[58] Field of Search ............... 355/204, 208, 214, 221, 355/225, 246, 273; 364/274.6, 275.2, 275.1

[56] References Cited

U.S. PATENT DOCUMENTS 4,573,788 3/1986 Nagashima et al. ............ 355/214 X
4,583,835 4/1986 Harada ................................ 355/214
4,619,522 10/1986 Imai ................................ 355/208 X
4,816,871 3/1989 Oushiden et al. .................. 355/208
4,875,184 10/1989 Yamakawa .......................... 364/807
4,888,618 12/1989 Ishikawa ............................ 355/208
4,914,924 4/1990 Takahashi ............................ 62/133

*Primary Examiner*—A. T. Grimley
*Assistant Examiner*—Nestor R. Ramirez
*Attorney, Agent, or Firm*—Fitzpatrick Cella Harper & Scinto

[57] ABSTRACT

An image forming apparatus using electrostatic images includes a state quantity detection device for detecting states which would exert some influence on the formation of images as quantities, a control quantity control device for controlling the operation of a process for forming images on an image bearing member, a rule storage device for relating the relation between the state quantities and the control quantity by a control device as a certain rule and storing it, and an inference device for inferring a control quantity to be determined from a set of state quantities on the basis of rules of the rule storage device. The picture image forming apparatus determines the operation quantity for the image bearing member of the process device on the basis of the calculated results of the inference device and forms an image.

17 Claims, 15 Drawing Sheets

FIG. 1
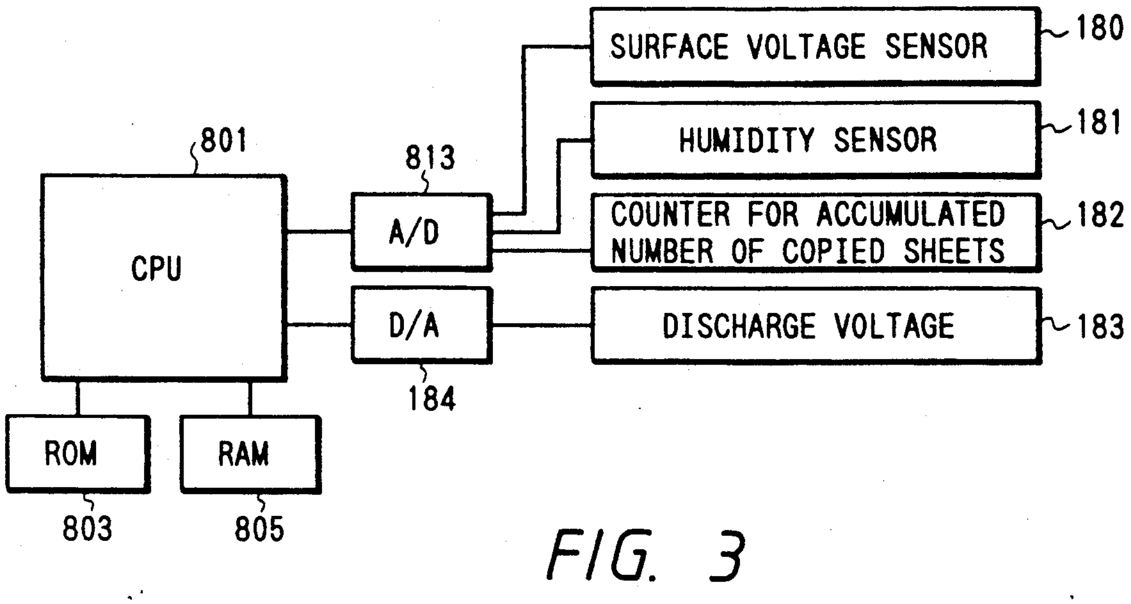
FIG. 3
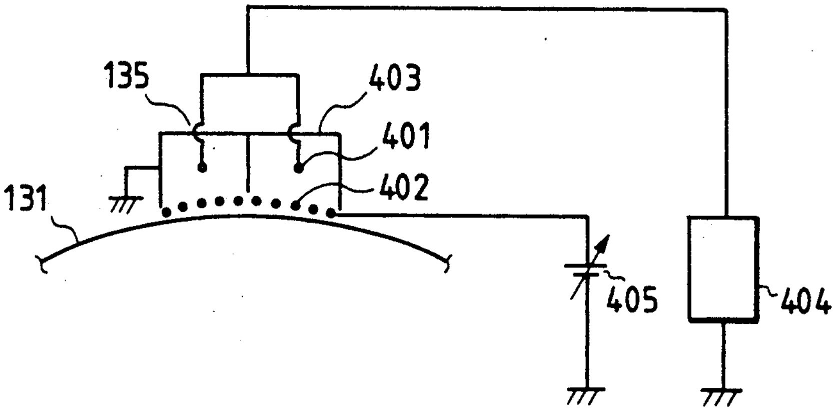
FIG. 5
| | | ORIGINAL DENSITY | | |
|---|---|---|---|---|
| | | DL | DM | DH |
| HUMIDITY | HL | PM | PL | PL |
| | HM | PH | PM | PL |
| | HH | PH | PH | PM |
HL, HM, HH REPRESENT FUZZY ASSEMBLY OF HUMIDITY
DL, DM, DH REPRESENT FUZZY ASSEMBLY OF TONER IMAGE DENSITY

FIG. 9

ACCUMULATED NUMBER OF COPIED SHEETS=CL

| | | ORIGINAL DENSITY | | |
|---|---|---|---|---|
| | | DL | DM | DH |
| HUMIDITY | HL | BM | BL' | BL |
| | HM | BH' | BM | BL' |
| | HH | BH | BH' | BM |

ACCUMULATED NUMBER OF COPIED SHEETS=CM

| | | ORIGINAL DENSITY | | |
|---|---|---|---|---|
| | | DL | DM | DH |
| HUMIDITY | HL | BH' | BM | BL' |
| | HM | BH | BH' | BM |
| | HH | BH | BH | BH' |

ACCUMULATED NUMBER OF COPIED SHEETS=CH

| | | ORIGINAL DENSITY | | |
|---|---|---|---|---|
| | | DL | DM | DH |
| HUMIDITY | HL | BH | BH' | BM |
| | HM | BH | BH | BH' |
| | HH | BH | BH | BH |

| | | ACCUMULATED NUMBER OF COPIED SHEETS | | |
|---|---|---|---|---|
| | | CL | CM | CH |
| HUMIDITY | HL | LH | LH' | LM |
| | HM | LM | LL' | LL |
| | HH | LL' | LL | LL |

| | | ACCUMULATED NUMBER OF COPIED SHEETS | | |
|---|---|---|---|---|
| | | CL | CM | CH |
| HUMIDITY | HL | BL' | BL | BL |
| | HM | BM | BL' | BL |
| | HH | BL' | BL | BL |

IMAGE FORMATION CONDITION CONTROLLING APPARATUS BASED ON FUZZY INFERENCE

BACKGROUND OF THE INVENTION

1. Field of the Invention

The present invention relates to an image forming apparatus which uses fuzzy inference, such as an electronic photography copier, and an electronic photography laser printer, which uses electrostatic images.

2. Related Background Art

It is well known that to obtain a high-quality image, desired potential must be supplied to a light-sensitive body (an image bearing member) in a charging process and a development bias must be set appropriately in a development process. Since a desired potential and a development bias differ depending upon room temperature, humidity, original density, the accumulated number of copied sheets or the like, these conditions must be considered at all times when the set values of a potential and a development bias are determined. Several examples about the relation between these conditions (state quantities), and a potential and a development bias (control quantities) will be described next.

When humidity is high, the surface of a light-sensitive body and a supporting member supporting it are moistened and a surface resistance value decreases. As a result, when electric charges are supplied to a light-sensitive body by a charging apparatus, some of the charges escape from the light-sensitive body and a desired potential cannot be obtained. For this reason, output from a charging apparatus must be increased under a high humiditY environment.

The fact that the density of a copy image varies with the density of the original is known. When high-density originals are copied in succession, the density of a copy image becomes high and a development agent is deposited on a white ground section, or, when low-density originals are copied in succession, the density of a copy image becomes low. Therefore, when the density of an original is high, a dark potential (potential after charging) must be set low or a development bias must be set high. When the density of an original is low, a dark potential must be set high, or a development bias must be set low.

In addition, when the number of copies is increased, the electrical capacity of a light-sensitive body increases as a result of the thickness of the light-sensitive layer becoming thinner and a required dark potential cannot be obtained. This results from the fact that the surface of a light-sensitive body is scratched, since after a visual image is transferred onto a transfer material (image bearing member), it passes through a process in which a remaining development agent on the light-sensitive body is scraped off with a brush or an elastic member (process of cleaning a light-sensitive body). Taking this factor into account, the output from a charging apparatus must be increased as the number of copies is increased.

As for the relation between various kinds of state quantities and control quantities mentioned above, the variations in all the state quantities cannot be corrected by using a single set value under the present situation. Hence, the output level in response to work is switched or output linked with a sensor is automatically set. Or, in some cases, no action is taken.

The switching of an output value in response to work entails much labor and the difficulty of judging switching timing. In particular, when judging switching timing, an appropriate output value must be found in which a number of conditions are considered simultaneously and decision criterion is entrusted to past experience based on much experimental data. A person who is not well informed about these criteria will have difficulty in judging switching timing. Also, if it is desired to set the output level to a more desired value, a plurality of output levels need to be held in memory and therefore the apparatus becomes expensive.

In addition, to set output automatically, a complex output control program must be prepared on the basis of a low of experimental data. As mentioned above, it is necessary to find an appropriate output value experimentally for a case where each of the conditions varies. A vast experimental data table is required before a program can be written and a lot of time and labor are needed. Actually, in many cases, many conditions cannot be taken into account and only those conditions which are particularly important are considered. In order to meet the need in recent years to improve the reliability of this kind of image forming apparatus, output control automation rather than the output value switching method, and a method of preparing a simple control program capable of easily taking in many conditions have been desired.

In a image forming apparatus, for example, a post charger (for supplying a uniform corona to a light-sensitive body before transferring to increase transfer efficiency), a transfer charging apparatus, and separation charger of an electronic photography copier include an apparatus that supplies charges to a toner image on a light-sensitive body from the outside, transfers the toner image onto a transfer material, and separates the transfer material from the light-sensitive body.

In particular, in a high-speed apparatus with a process speed exceeding about 400 mm/sec, regarding the charging quantity of each charger, factors such as the characteristics of a toner on a light-sensitive body, i.e., the quantity of charges of a toner (dependent on the state of an original), kinds of transfer materials, the state under which a transfer material is moistened, the transfer speed of a main body, the history state, such as the dirtiness of each charger, and so on are considered, and the set value of each charger output is obtained through repetition of complex experiments. However, generally, the deviation of the above-mentioned factors cannot be corrected using a single set value, so the switching of an output level in response to work and the automatic setting of output linked with a humidity sensor or the like are performed.

However, the switching of output level in response to work entails much labor and the difficulty of judging switching timing. Also, it is necessary to hold each of the plurality of the output levels from the charger in memory and the apparatus is expensive. Further, where output is automatically switched using a humidity sensor, an expensive humidity sensor is needed and the detected humidity sometimes does not correspond to the actual moisture content of a toner and a transfer material.

Generally, since the change in the atmospheric humidity acts on a toner and a transfer material with a certain time lag, accurate humidity detection is of no use. To use a humidity sensor effectively, a number of experiments and a complex, high-voltage control program are needed.

SUMMARY OF THE INVENTION

An object of the present invention is to enable a control of a process means for use in formation of images and for acting on the image bearing characteristics in an image forming apparatus which uses electrostatic images, as mentioned above, to be performed with high accuracy.

Another object of the present invention is to provide a control of the above-mentioned process means which is most appropriate after the existing circumstances are considered.

Still another object of the present invention is to realize a control of the above process means which provides a high-quality image.

The present invention which achieves the above objects is an apparatus for forming images using electrostatic latent images. The apparatus comprises a state quantity detection means for detecting a state which would affect the formation of an image as a quantity, a control quantity control means for controlling the operation of a charger, a developer, and a process means for an optical system or the like that acts on an image bearing member such as an electronic photography light-sensitive body, a transfer material or the like to form an image, a rule storage means for relating the relation between the above state to be detected and the control quantity by the control means as a certain rule and storing it, and an inference means for inferring the control quantity to be determined from a set of state quantities. The apparatus determines an action quantity for the image bearing member of the process means on the basis of the calculated results of the inference means.

These and other objects, features and advantages of the present invention will become clear when reference is made to the following description of the preferred embodiments of the present invention, together with reference to the accompanying drawings.

BRIEF DESCRIPTION OF THE DRAWINGS

FIG. 1 is a control block diagram of a charging apparatus;

FIG. 3 is a schematic view of a charge high-voltage unit;

FIG. 5 is an explanatory view explaining the fuzzy rule of the first embodiment;

FIG. 9 is an explanatory view explaining a fuzzy rule of the second embodiment;

DETAILED DESCRIPTION OF THE PREFERRED EMBODIMENTS

Figure 2:
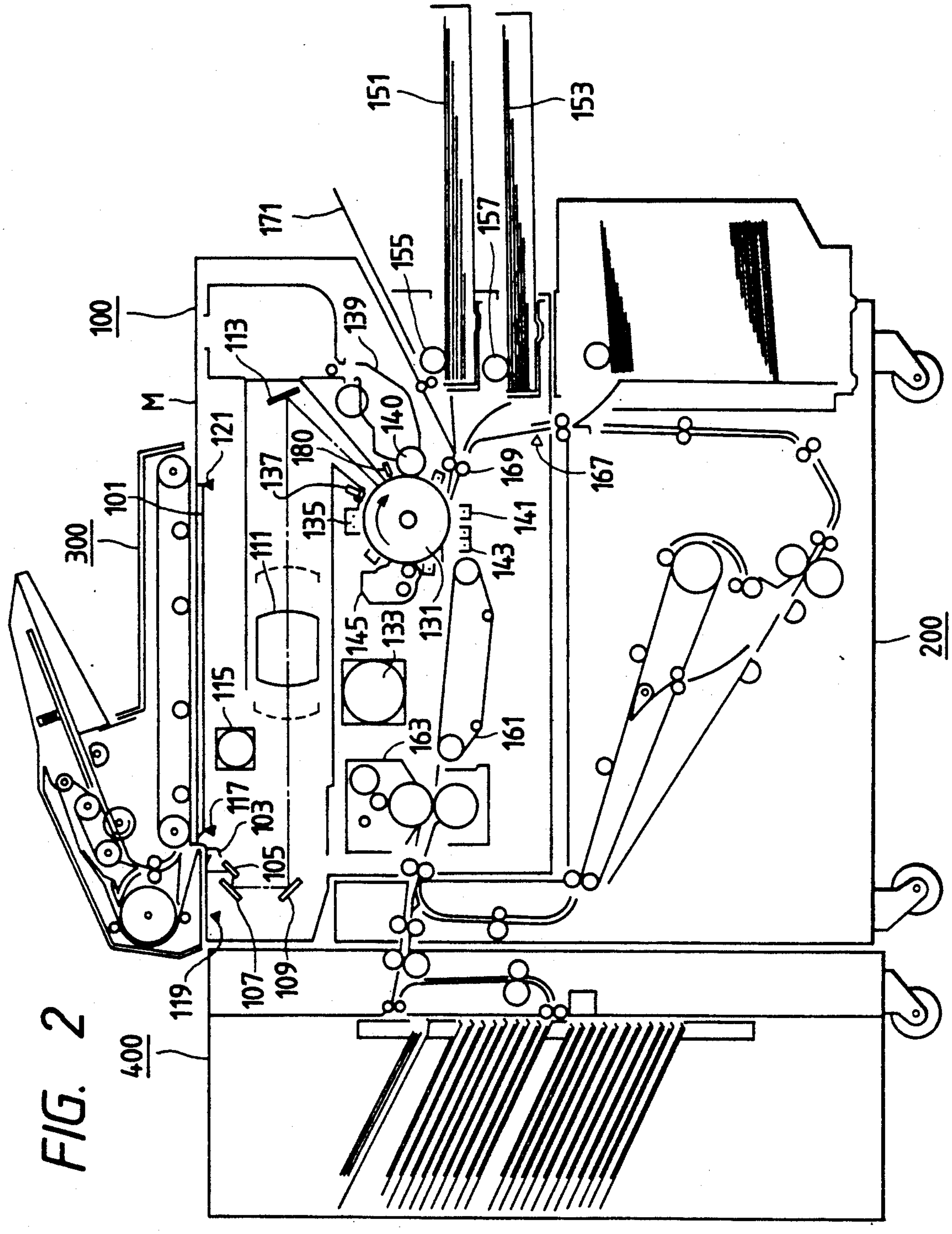
FIG. 2 is a schematic view illustrating the entire image forming apparatus.

Embodiments of the present invention will be explained in detail hereinunder with reference to the accompanying drawings.

FIG. 1 is a basic block diagram of a image forming apparatus of the present invention. Shown in the figure are a CPU 801 to be described later for performing fuzzy inference, a ROM 803 to be described later in which fuzzy rules and membership functions are stored, a RAM 805 to be described later used for a work area when fuzzy inference is performed, an A/D converter 813 for converting a digital signal to an analog signal, a D/A converter 814 for converting an analog signal to a digital signal, a surface potential sensor 180 for measuring the surface potential of a light-sensitive drum 131 (FIG. 2), a humidity sensor 181 for measuring humidity, a counter 182 for storing the accumulated number of copied sheets, a charge high voltage 183, the high-voltage output value of which is controlled by an instruction from the CPU 801. A room temperature sensor may be provided for detection for measuring temperature in place of the above humidity sensor.

FIG. 2 shows the internal configuration of a image forming apparatus in one embodiment of the present invention. Shown in FIG. 2 are a main body 100 having an image reading function and an image recording function, a pedestal 200 having a double-side process function to reverse a recording medium (sheet) at both-side recording and a multi-recording function to perform a plurality of recording on the same recording medium, a recirculating original supply apparatus 300 (hereinafter referred to as "RDF") for supplying originals automatically, and a staple sorter 400. Each of these apparatuses 200 to 400 can be used in combination at will.

In the main body 100, also shown in FIG. 2 are an original glass stand on which an original is placed, an illumination lamp 103 (light exposure lamp) for illuminating an original, scanning reflection mirrors 105, 107 and 109 (scanning mirror) for changing the light path of the reflected light of the original, a lens 111 having a focusing function and a varying magnification function, a fourth reflection mirror 113 (scanning mirror) for changing the light path, an optical system motor 115 for driving the optical system, sensors 117, 119 and 121, a light-sensitive drum 131, a main motor 133 for driving the light-sensitive drum 131, a charger 135 (hereinafter referred to as a "high-voltage unit"), a blank exposure unit 137, a developer 139, a transfer charger 141, a separation charger 143, a cleaning device 145, an upper-step cassette 151, an lower-step cassette 153, a manual paper insert slot 171, paper supply rollers 155 and 157, a regist roller 159, a transfer belt 161 for transferring paper on which an image is recorded to the fixation side, a fixer 163 for fixing transferred recording paper by thermal fixation, and a sensor 167 used at both-side recording.

The surface of the light-sensitive drum 131 consists of a photoconductor and a seamless light-sensitive body using a conductor. This drum 131 is axially supported and starts to rotate in the arrow direction in this figure by means of the main motor 133 which operates in response to the pressing of a copy start key to be described later. Next, an original placed on the original glass stand 101 is illuminated by the illumination lamp 103 integrally formed with the first scanning mirror 105, and the reflected light of the original forms an image on the drum 131 through the first scanning mirror 105, the second scanning mirror 107, the third scanning mirror 109, the lens 111 and the fourth scanning mirror 113.

The drum 131 is corona-charged by the high voltage unit 135. Then, an image (original picture image) illuminated by the illumination lamp 103 is exposed by a slit and an electrostatic latent image is formed by a known Carlson process.

Next, the electrostatic latent image on the light-sensitive drum 131 is developed by the development roller 140 of the developer 139, is made visible as a toner image. The toner image is transferred onto transfer paper by means of the transfer charger 141, as as described later. That is, transfer paper on the upper-step cassette 151 or the lower-step cassette 153, or transfer paper set on the manual paper insertion slot 171 is fed to the main-body apparatus by the paper supply roller 155 or 157, and the front end of the latent image and the front end of the transfer paper are registered. Thereafter, the transfer paper is ejected outside the main body 100 after it passes the section between the transfer charger 141 and the drum 131.

After transferring, the drum 131 continues to rotate and its surface is cleaned by the cleaning device 145 made up of a cleaning roller and an elastic blade.

FIRST EMBODIMENT

Next, the above-mentioned high voltage unit will be described.

FIG. 3 shows a known scortron type high voltage unit used in the present invention. Shown in the figure are a discharge wire 401, to which a high voltage is applied by a high-voltage power supply 404, a grid 402 to which a bias is applied by a bias power supply 405, and a grounded shield material 403. If the output from the power supply 404 is made larger, more current flows through the light-sensitive drum 131 and the charge potential of the light-sensitive body becomes high. Also, if the bias 405 is made higher, since a current flows through the light-sensitive drum until the potential matches the bias, the charge potential becomes high.

At this point, an example of the operation of the charge high-voltage control will be described. The following two state quantities are used as state quantities at high voltage control:

(i) Humidity (ii) Original density.

As a control quantity, (iii) charge high voltage for the corona discharge device 135 is used.

Figure 4A:
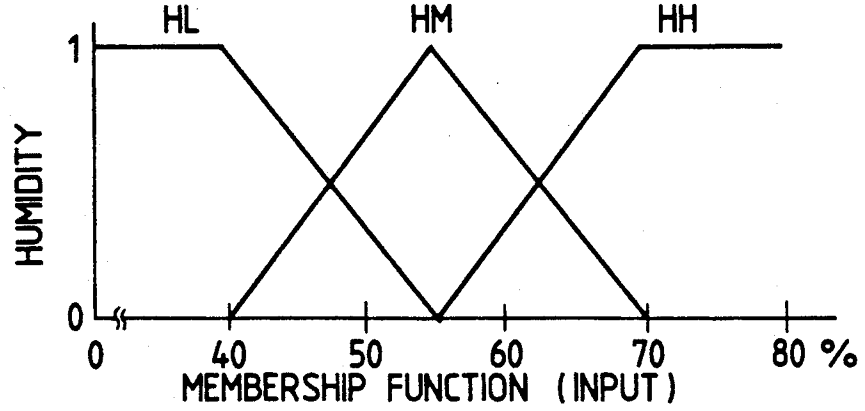
FIGS. 4A, 4B, and 4C are graphs showing input and output membership functions in a first embodiment.
Figure 4B:
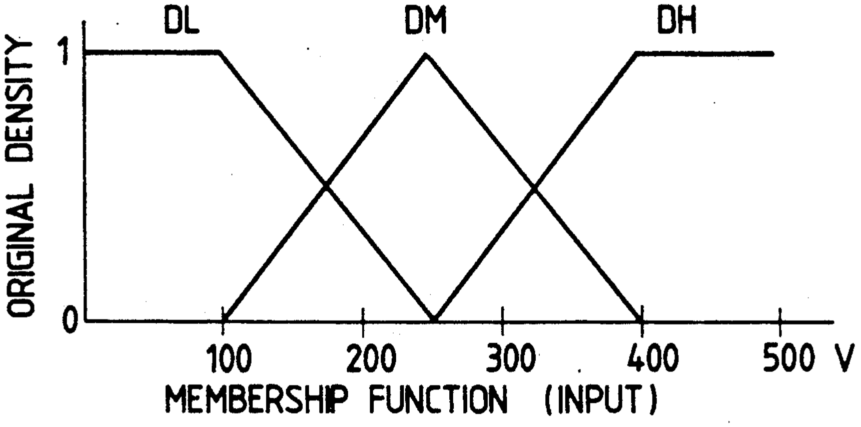
Figure 4C:
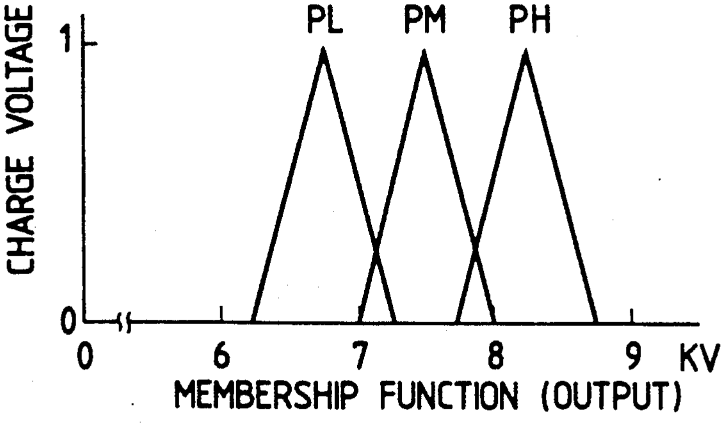

FIG. 4 shows a fuzzy set called membership functions for the above state quantities and the control quantity of (i) to (iii). Humidity, original density, charge high voltage are broadly classified into several sets. For example, in the case of humidity, (1) HL (Humidity Low)
Humidity is low.

(2) HL (Humidity Medium)
Humidity is medium.

(3) HH (Humidity High)
Humidity is high.

The degree belonging to each set is represented by a value from 0 to 1. An explanation will be given by taking as examples a membership function for humidity in FIG. 4A, a membership function for original density in FIG. 4B, a membership function for charge high voltage output in FIG. 4C, and HM (humidity middle) in FIG. 4C. The degree belonging to the set of HM when humidity is 55%, is 1.0, and the degree belonging to the set of HM when humidity is 48% or 62%, is 0.5. The same applies in other cases.

Next, a method of calculating charge high-voltage output from the state quantity of original density will be described.

To determine charge high-voltage output, for example, the following fuzzy rules are used.

(Rule 1)

If humidity =HL and original density =DL
then charge high-voltage output =PM.

(Rule 2)

If humidity =HH and original density =DL
then charge high-voltage output =PH.

In this way, a fuzzy rule is set as required. The fuzzy rule in this case is shown in FIG. 5.

Figure 6:
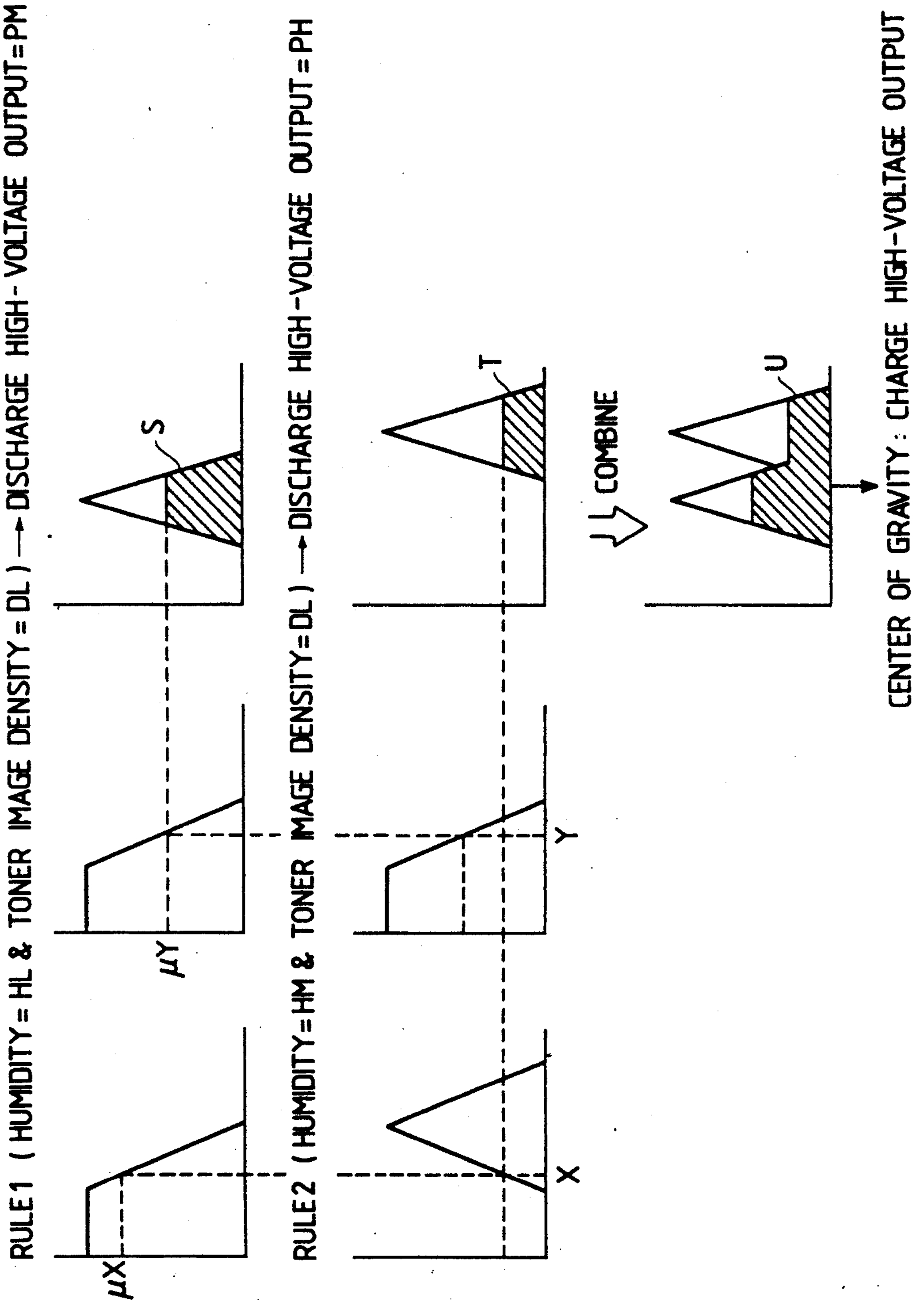
FIG. 6 is an explanatory view explaining the method of inferring a charge high-voltage set value.

FIG. 6 shows an example in which charge high-voltage output is calculated from the fuzzy rule using the above (Rule 1) and (Rule 2).

As an example, a case where humidity is denoted by x and original density is denoted by y will be considered.

In (Rule 1), the humidity is included in the set of HL at a degree of $\mu x$ to the input x by the membership function for the humidity, and the original density is included in the set of DL at a degree of $\mu y$ to the input y by the membership function for the original density. Thereafter, minimum values of $\mu x$ and $\mu y$ are taken and the values are assumed to be a degree that satisfies the conditions of rule 1. If the MIN operation of the values and the membership function for the charge high-voltage output is performed, the shape of the charge high-voltage output becomes a trapezoid shown in the shaded portion of S.

A similar calculation is performed in (Rule 2) and a trapezoid shown in the shaded portion of T appears. Thereafter, maximum values of the sets of S and T are taken, and a new set shown in the shaded portion of U is created. A value obtained from the calculation of the center of gravity of this set is set as a charge high-voltage output obtained by fuzzy inference. A similar step is performed on all fuzzy rules shown in FIG. 5.

Figure 7:
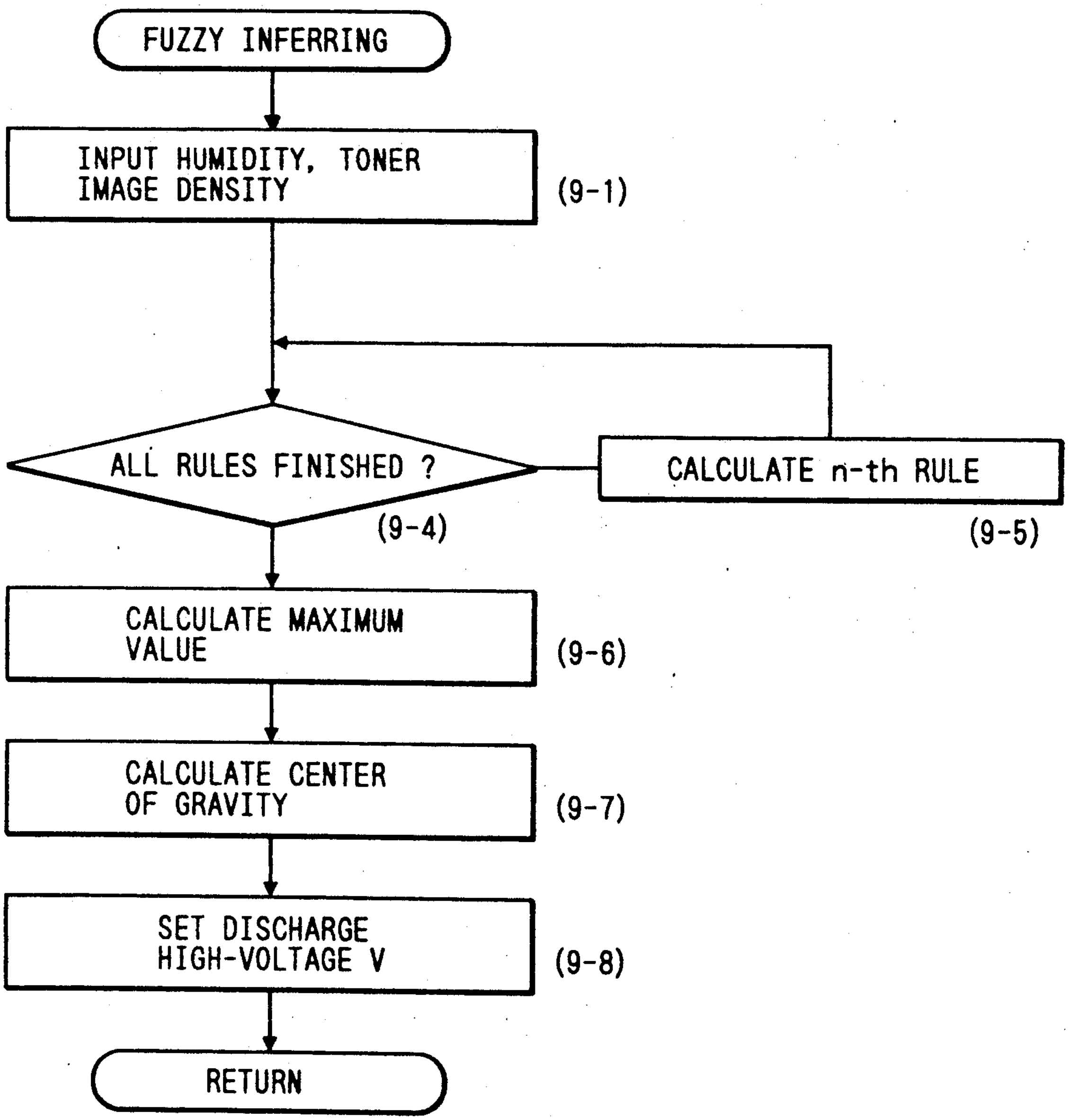
FIG. 7 is a high-voltage setting flowchart.

Next, the flow of a fuzzy inference subroutine operation will be explained with reference to the flowchart of FIG. 7.

First, humidity and original density are measured using the humidity sensor 181 (installed inside an apparatus but its location is not particularly specified) and the surface electrometer 180 (9-1).

Thereafter, for all fuzzy rules in FIG. 5, by using the above-mentioned method and in accordance with each fuzzy rule, a degree belonging to the fuzzy set of control quantities is calculated from the degree in which state quantities belong to the fuzzy set (9-4) (9-5); a maximum value of the set belonging to each rule is calculated (9-6); the most highly probable control quantity is calculated by determining the center of gravity (9-7); and the center of gravity is set as a charge high voltage V to be determined (9-8).

The charge high voltage V is set at a value by units of 100 mV.

SECOND EMBODIMENT

Next, a second embodiment will be explained. In the second embodiment, as a state quantity, an accumulated number of copied sheets is included to take the degradation of the light-sensitive body into consideration in addition to the humidity and original density mentioned in the first embodiment. A potential control means is adapted to control a bias voltage to be applied to the grid in the scortron type charging apparatus mentioned in the first embodiment. That is, the state quantities are: (i) humidity, (ii) original density, and (iii) accumulated number of copied sheets. The control quantity is (IV) a grid bias voltage. The accumulated number of copied sheets is stored in a counter and the value can be read out as desired.

Figure 8A:
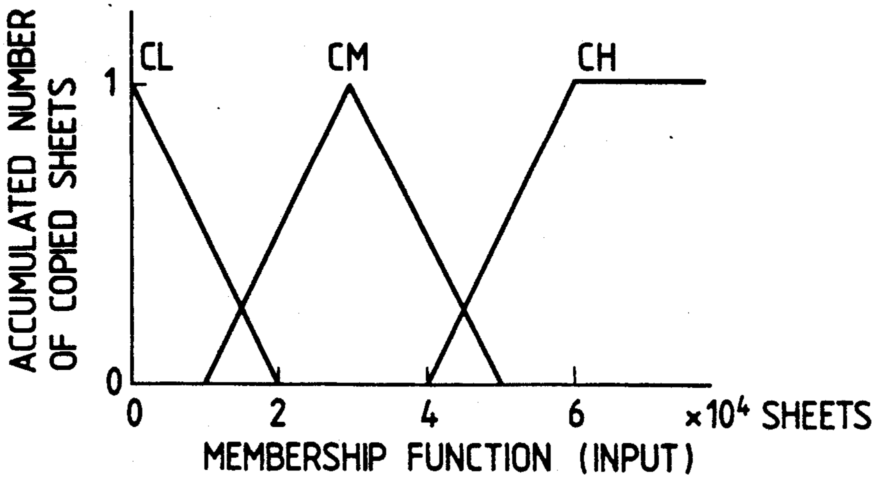
FIGS. 8A and 8B are graphs showing the input and output membership functions (a portion) of a second embodiment.
Figure 8B:
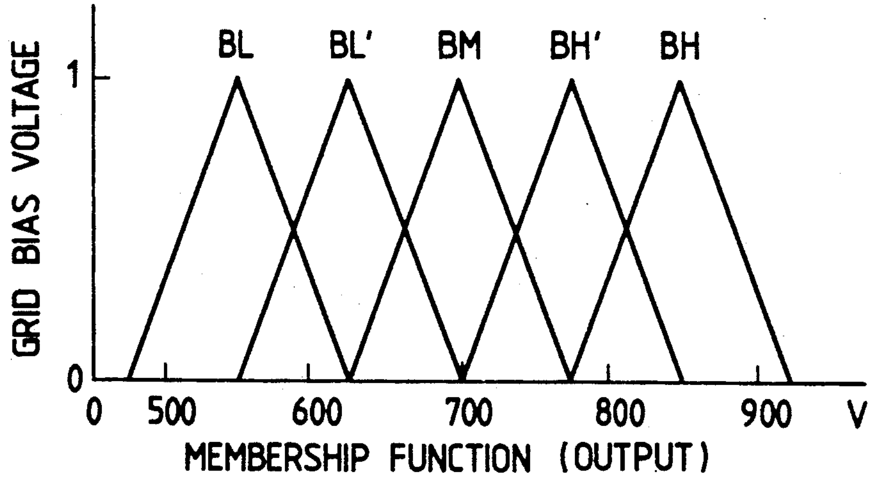

FIG. 8A shows the accumulated number of copied sheets 3. FIG. 8B shows the membership functions of a bias voltage 4. The membership function of state quantities of (i) humidity and (ii) original density is the same as in the first embodiment. Fuzzy rules for state quantities 1 to 3 and control quantity 4 are as shown in FIG. 9.

Next, a description will be given regarding a method of calculating a bias voltage from the state quantities of 1 to 3. The method is the same as in the first embodiment. For example, the following fuzzy rules are used (See FIG. 9).

(Rule 1)

If humidity =HL and original density =DL and accumulated number of copied sheets =CL then bias =BM.

(Rule 2)

If humidity =HL and original density =DL and accumulated number of copied sheets =CM then bias =BH'.

Figure 10:
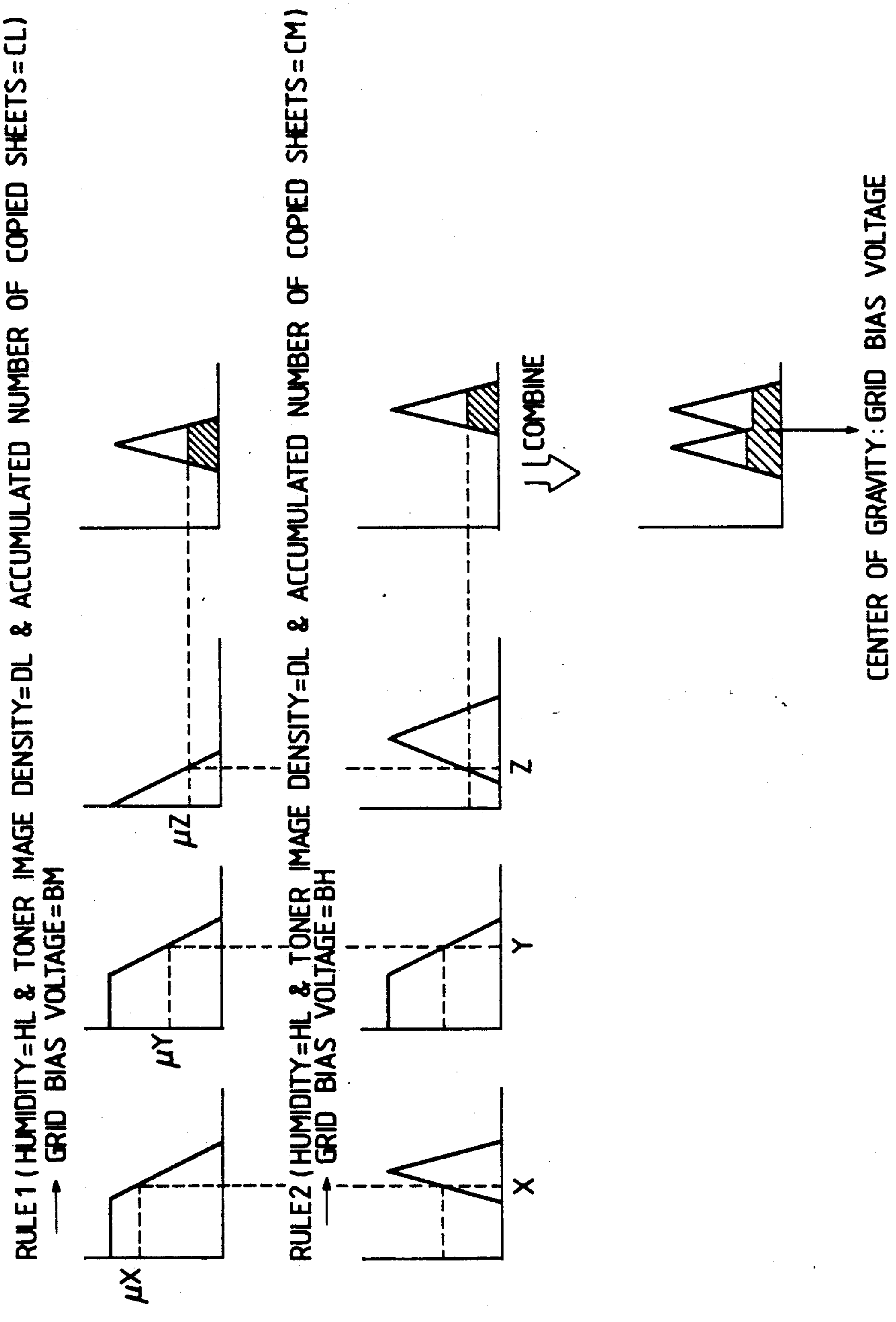
FIG. 10 is an explanatory view explaining a method of inferring a bias set value.

A method of calculating a bias by fuzzy inference using the above (Rule 1) and (Rule 2) is shown in FIG. 10. The following are denoted: humidity =X, original density =Y, and accumulated number of copied sheets =Z. By performing fuzzy inference shown in FIG. 10 on each fuzzy rule shown in FIG. 9, the most highly probable control quantity is calculated from the calculation of the center of gravity and the center of gravity is defined to be the set value of a bias voltage.

THIRD EMBODIMENT

In the above-mentioned two embodiments, the control the dark potential of a light-sensitive body was described. However, the fuzzy control of a bright potential (white ground potential after exposure) and an intermediate potential (half-tone potential) in addition to the dark potential is possible. A bright potential is related to the fogging density of a white ground of an image. A fogging is a phenomenon that a toner is deposited on an area to be originally a white ground on an image. To reduce a fogging, a bright ground potential must be set at an appropriate value. It is experimentally known that a fogging increases when the potential difference between a bright potential $V_L$ and a development bias voltage $V_{DC}$ is either too small or too large. Further, it is known that a right value differs depending upon humidity and the accumulated number of copied sheets. The causes of these are not yet clarified, but, for example, the following can be inferred.

That is, some of the toner particles charged on a polarity opposite to a desired polarity on a development roller are deposited on a white ground by receiving an electrical force acting from the development roller to the bright potential section, causing a fogging. The larger the potential difference between $V_L$ and $V_{DC}$ is, the more the fogging increases because the toner particles receive a larger electrical force. Since, if humidity and the accumulated number of copied sheets vary, the charge quantity of toner particles whose polarity is reversed varies, it is supposed that the amount of fogging varies. The third embodiment intends to control $V_L$ so that a fogging is diminished at all times by fuzzy inference irrespective of humidity and the accumulated number of copied sheets. $V_L$ can be controlled using an amount of exposure which is controlled by a lighting voltage of the illumination lamp 103.

Figures 11, 12:
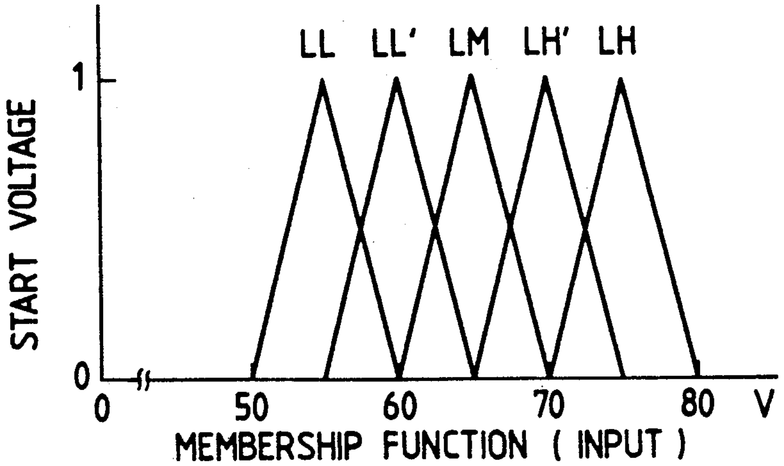
FIG. 11 is a graph showing an output membership function of a third embodiment.
FIG. 12 is an explanatory view explaining a fuzzy rule of the third embodiment.

The state quantities in this embodiment are 1 humidity and 2 are accumulated number of copied sheets; a control quantity is 3 a lighting voltage. The membership functions of 1 and 2 are the same as in the second embodiment and the method of detecting those quantities are as mentioned earlier. FIG. 11 shows a membership function of 3. Fuzzy rules developed from experiments are summarized in FIG. 12. The method of actual fuzzy inference can be performed in the same way as in the first and second embodiments and therefore an explanation thereof is omitted.

FOURTH EMBODIMENT

Figures 13, 14:
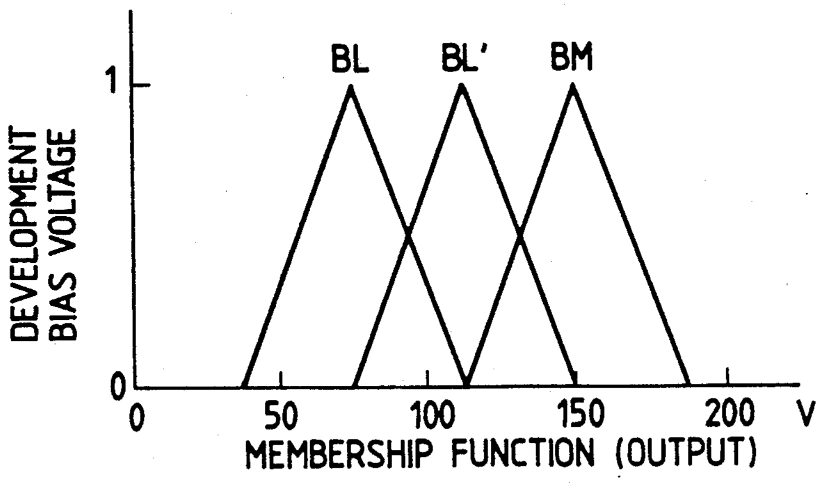
FIG. 13 is a graph showing an output membership function of a fourth embodiment.
FIG. 14 is an explanatory view explaining a fuzzy rule of the fourth embodiment.
Figure 15:
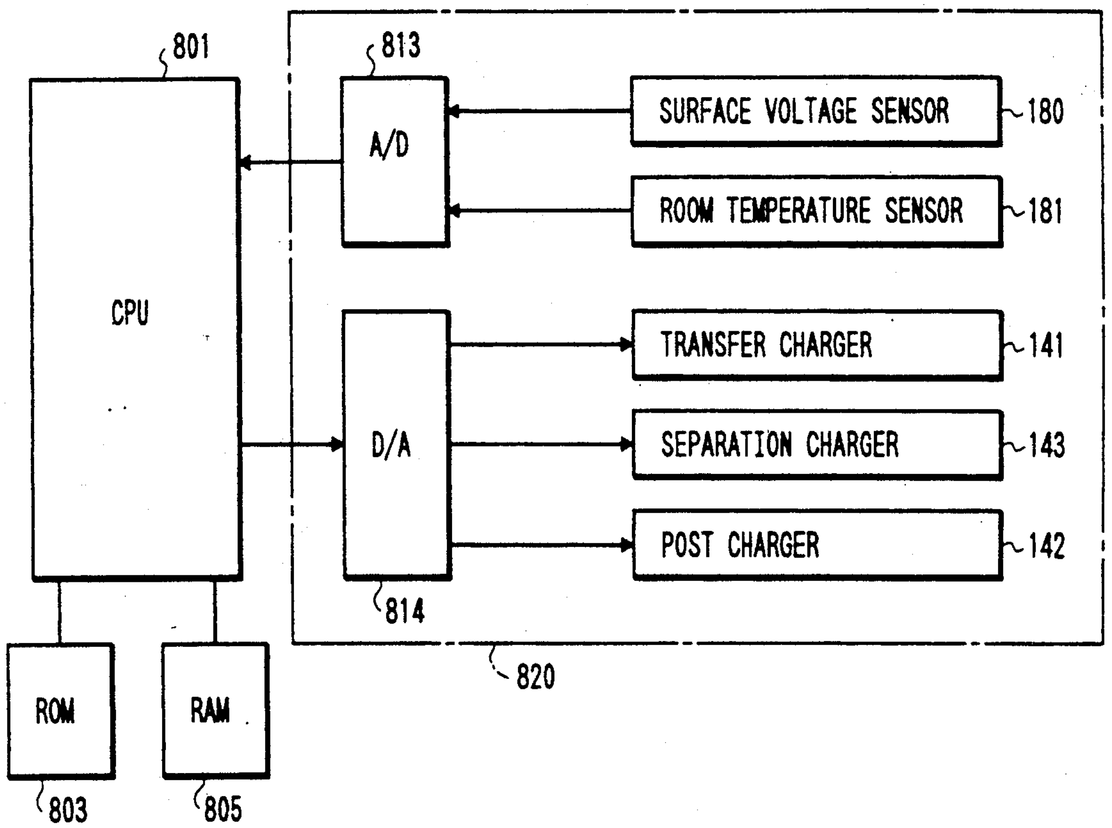
FIG. 15 is a block diagram illustrating the configuration of the embodiment of the present invention.

Next, a description is given of a fourth embodiment in which a development bias voltage is controlled suitably at all times so as to stabilize original density (varies depending upon humidity and the accumulated number of copied sheets). This variation is thought to be due to the fact that the quantity of charges of toner particles, and the distribution state of the toner particles on the development roller, vary depending upon humidity and the accumulated number of copied sheets. That is, if humidity is high, a toner contains wafer and resistivity decreases, causing the charges of the toner to escape easily, and original density decreases. On the other hand, when humidity is low, toner particles having excessive charges stick to the development roller by a reflection force, and a phenomenon occurs such that development cannot be made. When the accumulated number of copied sheets increases, the amount of toner particles having excessive charges increases and it is supposed that developing efficiency decreases further. The state quantities in this embodiment are 1 humidity and 2 the accumulated number of copied sheets, and a control quantity is 3 a development bias voltage. The membership functions of 1 and 2 are the same as in the second embodiment. The membership function of the development bias voltage 3 is shown in FIG. 14. The fuzzy rules relating to it are shown in FIG. 15. The method of actual fuzzy inference can be performed in the same way as the first through the third embodiment, so an explanation thereof is omitted.

FIFTH EMBODIMENT

In the fifth embodiment, the operation of a corona discharge apparatus as a process means of the copier shown in FIG. 1 is controlled by fuzzy inference. As examples of a discharge apparatus, the transfer charger 141, the separation charger 143, and the post charger 142 are shown.

Figure 16:
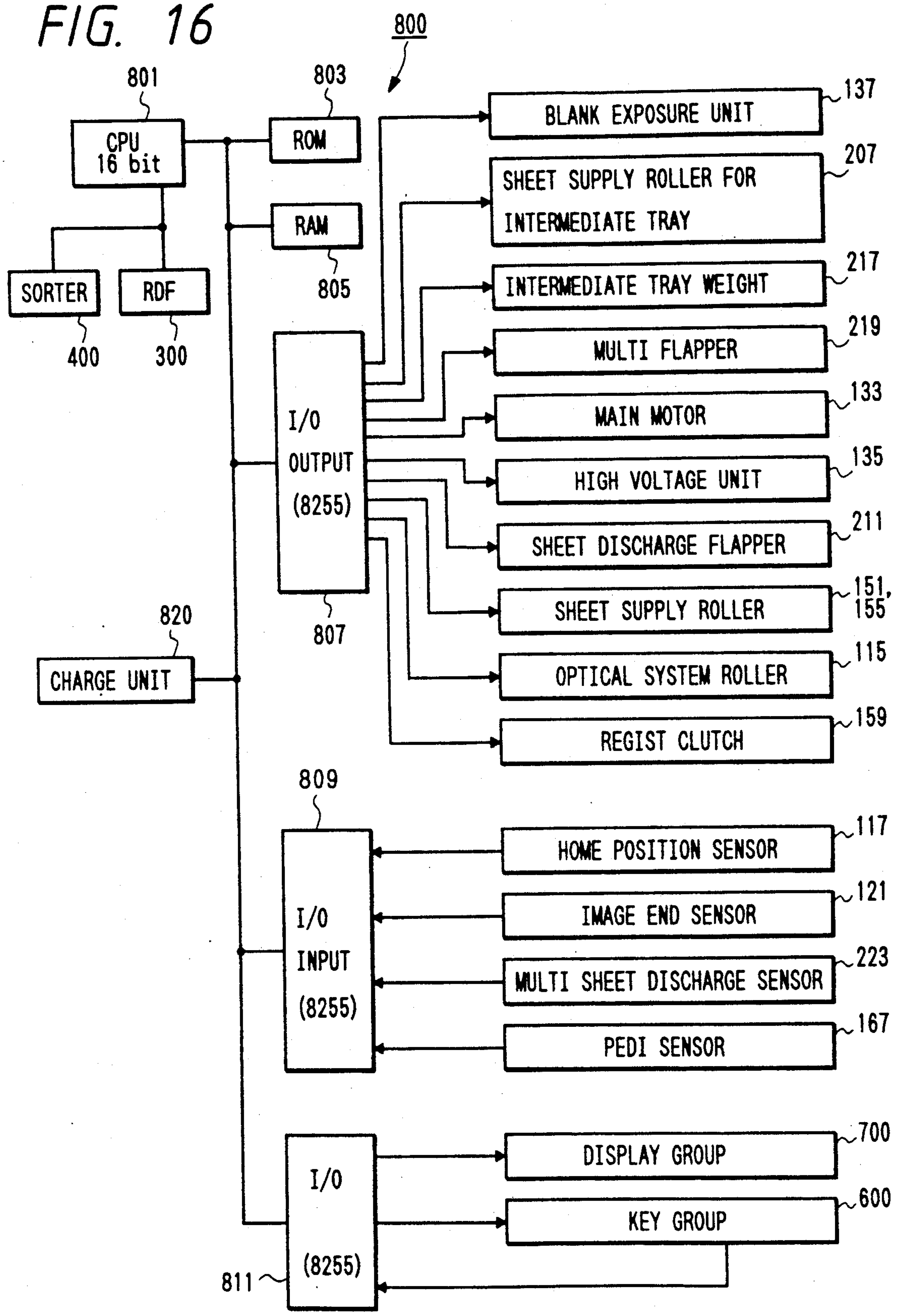
FIG. 16 is a block diagram illustrating a control apparatus in one ,embodiment of the present invention.

FIG. 16 shows the configuration (block diagram) of the fifth embodiment of the present invention. In FIG. 16, numeral 801 denotes a CPU which calculates, as a suitability calculation means, the suitability of a detected state quantity on the basis of the membership function for the state quantity stored in the ROM 803, obtains, as a calculation means, the inference results of each rule stored in the ROM 803 by a predetermined calculation on the basis of the calculated suitability, and infers, as an inferring means, a control amount on the basis of the inferred results of each rule obtained so as to perform fuzzy inference. The ROM 803 is for use as a membership function storage means and rule storage means, and stores control programs in addition to fuzzy rules and membership functions. Numeral 804 denotes a RAM used for a work area when fuzzy inference is performed.

Numeral 820 denotes a charge unit shown in FIG. 16. It is, for example, constructed as follows. That is, the numeral 180 is a surface potential sensor employed as a state quantity detection means which detects the surface potential of the drum 131. Numeral 181 denotes a room temperature sensor as a state quantity detection means which detects room temperature. Numeral 813 denotes an A/D converter which converts an analog signal from the surface potential sensor 180 and the room temperature sensor 813 to a digital signal. Numeral 814 denotes a D/A converter which converts a digital signal from the CPU 801 to an analog signal. Numerals 141, 143, and 142 denote a transfer high voltage, a separation high voltage, and a post high voltage, respectively. Each of these high voltages are output in accordance with an instruction input from the CPU 801 via the D/A converter 814.

In the control apparatus 800 (FIG. 16), numerals 801, 300, 400, 803 and 805 denote the same portions as in FIG. 16.

Numeral 807 denotes an interface (I/0), for transferring an output signal, which outputs a control signal to a load of a main motor 133 or the like. Numeral 809 denotes an interface, for transferring an input signal, which accepts an input signal from an image sensor and outputs it to the CPU 801. Numeral 811 denotes an interface which controls the input and output from a key group 600 and a display group 700. In the interfaces 807, 809, and 811 a μPD8255 (input and output circuit ports manufactured by NEC Corp.) is used.

Figure 17:
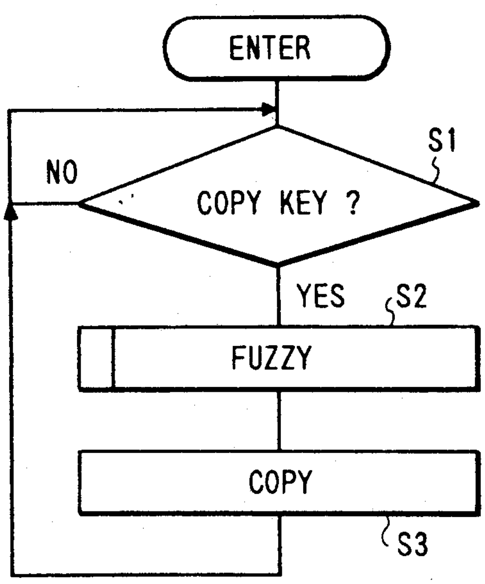
FIG. 17 is a flowchart illustrating a control procedure by a CPU 801.

FIG. 17 is a flowchart showing the control procedure by the CPU 801.

When there occurs a key input in step S1, fuzzy control is performed in step S2 and a copy is started in step S3.

Figure 19A:
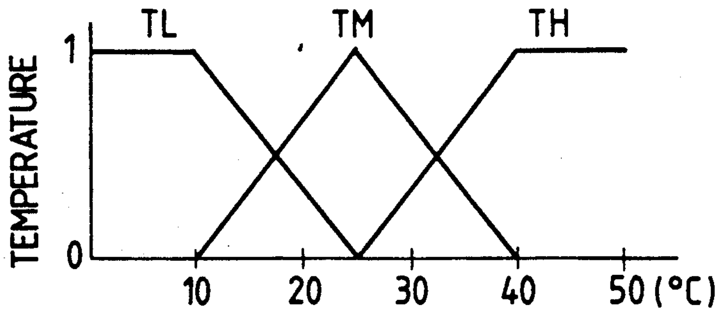
FIGS. 19A to 19E are views illustrating one example of a membership function.
Figure 19B:
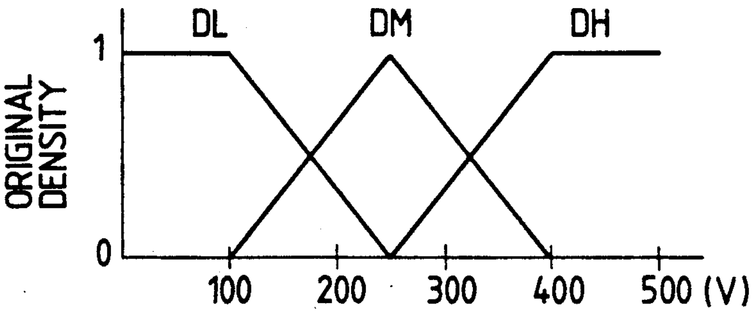
Figure 19C:
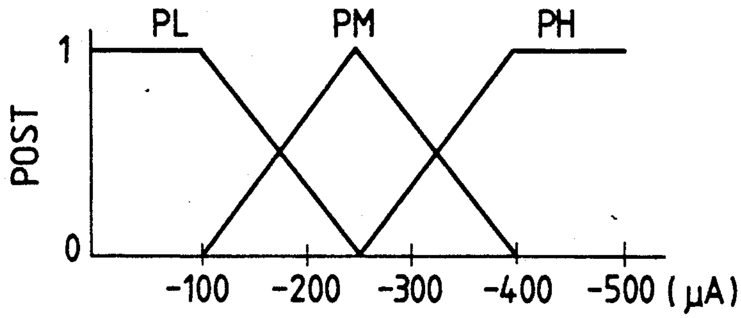
Figure 19D:
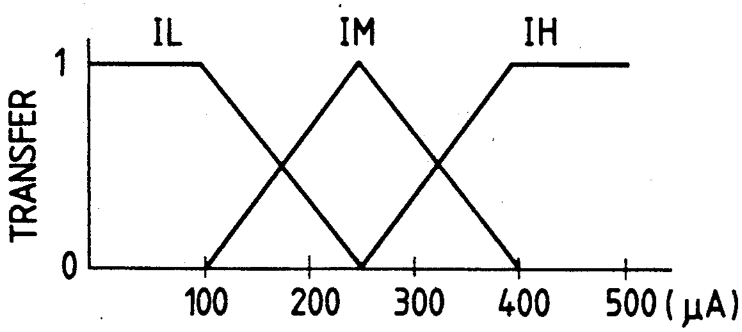
Figure 19E:
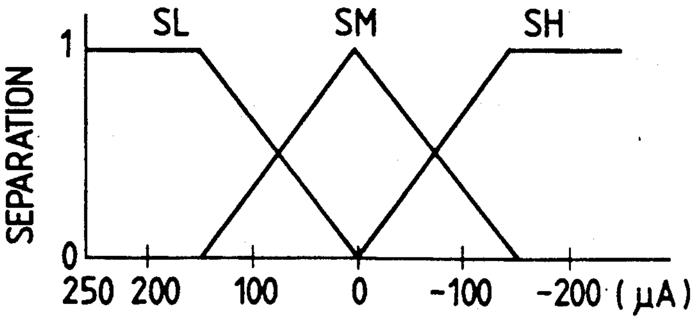

In the fuzzy control of this embodiment, of environmental factors, original density (toner amount after development process, amount of toner charges), types (thickness, size) of transfer paper, status (status of water content =electrical resistivity) of transfer paper, dirtiness of a charger, transfer speed of paper, and a lot of fuzzy variation factors (state quantities) related to each other, as state quantities, for example, 1 room temperature and 2 original density, are used and, as operation amounts, for example, (a) transfer high voltage input, (b) separation high voltage output, and (c) post high voltage output, are used. The membership functions of these sets are shown in FIGS. 19A to 19E. FIG. 19A shows membership function for room temperature. FIG. 19B shows a membership function for original density. FIG. 19C shows a membership function for post high voltage output. FIG. 19D shows a membership function for transfer high voltage output. FIG. 19D shows a membership function for separation high voltage output.

As will be understood from FIGS. 19A to 19E, the factors of room temperature, original density, transfer high voltage output, separation high voltage output, and post high voltage output have three fuzzy sets each.

For example, for the three fuzzy sets of the room temperature, fuzzy labels are given with "TL", "TM", and "TH";

TL (Temperature Low): fuzzy set representing "room temperature is low".

TM (Temperature Medium): fuzzy set representing "room temperature is medium".

TH (Temperature High): fuzzy set representing "room temperature is high".

The degree belonging to each set takes any value between "0" to "1". In the case of a fuzzy set given with a fuzzy label TM shown in FIG. 19A, the degree belonging to a set of room temperature 25° C., namely, suitability, is "1.0" and suitability in the case of room temperature 18° C. or 32° C. is "0.5".

To determine post high voltage output, the fuzzy rules of the following rules 1 and 2 are used:

Rule 1 If x =TH and y =DM then z =PL

Rule 2 If x =TM and y =DM then z =PM where x =room temperature, y =original density, and z =post high voltage output. These rules are shown in Table 1 as a rule table.

Figure 18:
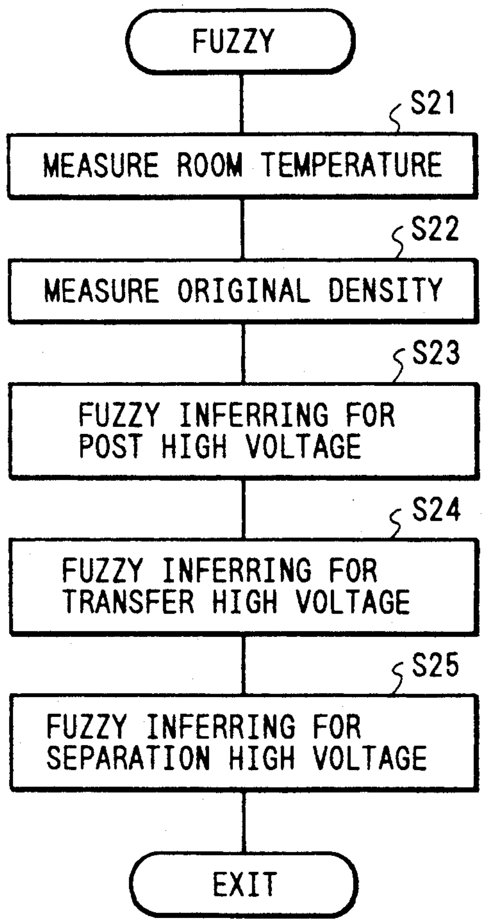
FIG. 18 is a flowchart illustrating a control procedure in step S2.

FIG. 18 is a flowchart showing the control procedure in Step 2 shown in FIG. 17.

Room temperature is measured in step S21 and original density is measured in step S22. In step S23, the amount of the post high voltage output is determined on the basis of rules 1 and 2, and the inference method. In step S24, similarly, the amount of the transfer high voltage output is determined. In step S25, similarly, the amount of the separation high voltage output is determined.

Next, a method of determining the amount of post high voltage output will be explained on the basis of rules 1 and 2, and the inference method.

If inference is performed according to rule 1, it is included in the set of TH at a degree of $\mu x$ from the membership function for room temperature with respect to room temperature x° C. The inference is included in the set of DM at a degree of $\mu y$ from the membership function for original density with respect to original density y. The minimum values determined regarding $\mu x$ and $\mu y$ are taken and the minimum values are defined to be degrees that satisfy the conditions of rule 1. A MIN operation of the value and the membership function for the post high voltage output is performed. The shape of the calculation results will become a trapezoid shown in the shaded portion of a set S shown in FIG. 21.

Figure 20:
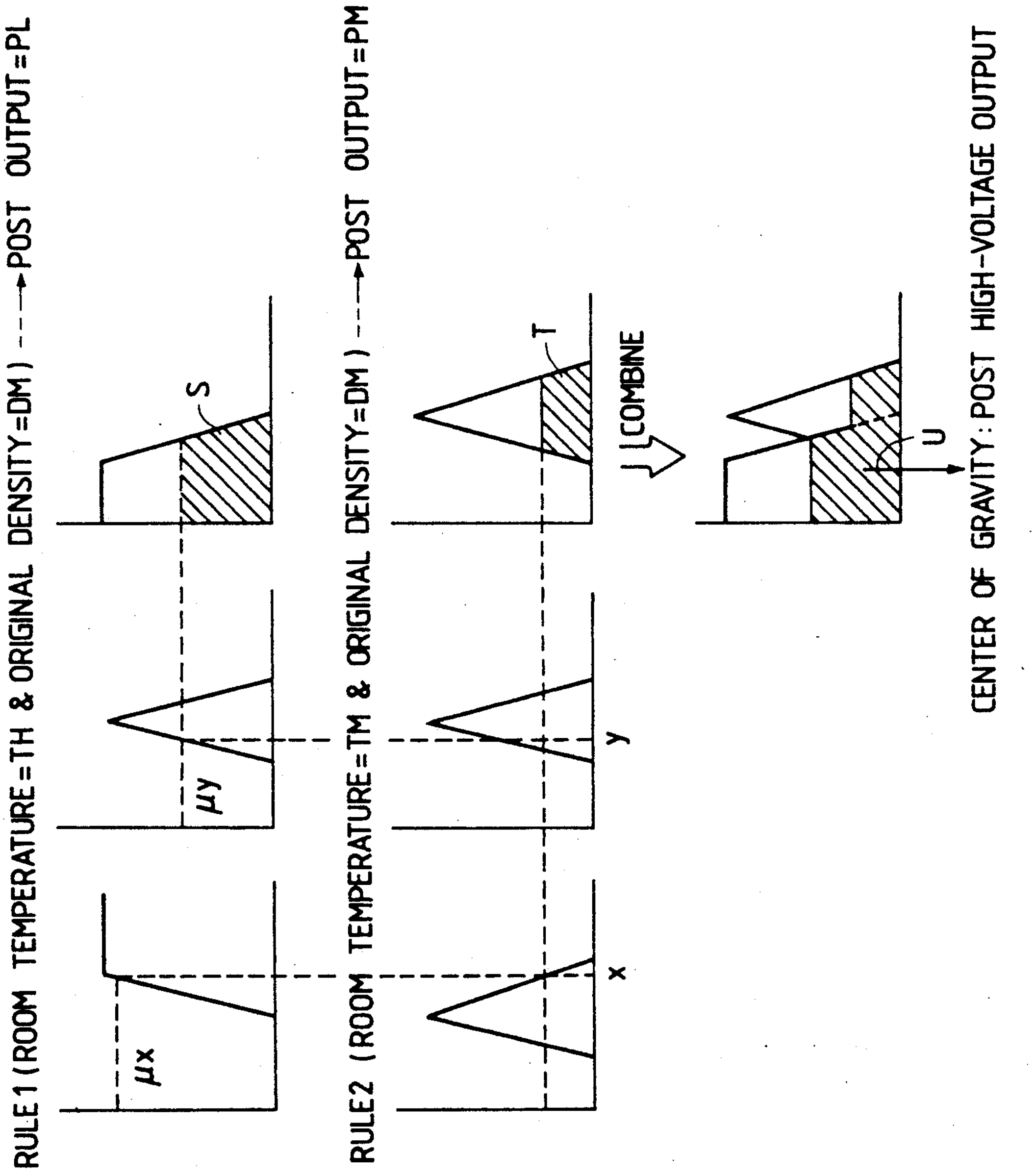
FIG. 20 is an explanatory view explaining the procedure of inference.

Next, when inference is performed according to rule 2, the shape of the calculation results will become the trapezoid shown in the shaded portion of a set T shown in FIG. 20.

Then, the determined inference results of each rule, i.e., the shaded portions of the sets S and T, are combined. The combined result becomes the shaded portion of a set U shown in FIG. 20. By calculating the center of gravity of this set, the post high voltage output is determined. The methods of determining transfer high voltage output and separation high voltage output do not substantially differ from the method of determining the post high voltage output. Tables 2 and 3 show rules in a case where transfer high voltage output and separation high voltage output are determined respectively, as a rule table.

In this embodiment, fuzzy rules, membership functions, control programs and so forth are stored in ROMs and calculation is performed using RAMs. However, a ROM which outputs an amount of operation corresponding to an input of a state quantity may be used. State quantities are not limited to the potential on the surface of a light-sensitive drum and room temperature. If they are state quantities relating to the charged state of a charging means, such as an original density read out by an original reading means, ambient humidity, water content state of transfer paper, the accumulated number of copied sheets, types (thickness, etc.) of transfer paper, transfer speed of transfer paper, dirtiness of a charger and so on, they may be used as the state quantities of the present invention. Also, an operation quantity is not limited to transfer high voltage, separation high voltage, or post high voltage, but high voltage of an electrostatic discharger or a primary charger may be used.

As regards post high voltage output control. a qualitative relation between state quantities and a control quantity are, for example, as shown in Table 4 below.

On the basis of this table, a rule table shown in Table 1 above may be created for inference. On that occasion, the number of state quantities is not limited to 2, but any number of these can be combined.

Likewise, an example in the case of the transfer high voltage is shown in Table 5 and that of the separation high voltage is shown in Table 6.

The algorithm of the above-mentioned fuzzy inference is one example. The algorithm may be modified. For example, instead of taking the center of gravity of maximum values of areas when a plurality of rules are combined, the value on the horizontal axis with respect to a value which becomes maximum on a vertical axis may be taken as an inference result. The number and contents of fuzzy rules may be modified on the basis of past experience.

As has been described above, according to the present invention, in a transfer and separation apparatus, the performance of which is determined by the environmental factors, original density (toner amount after development process, amount of toner charges), types (thickness, size) of transfer paper, status (status of water content =electrical resistivity) of transfer paper, dirtiness of a charger, transfer speed of paper, and a lot of fuzzy variation factors (state quantities) related to each other, high voltage output control can be performed automatically by calculating the optimum control amount from these control amounts complexly related to each other. As a result, a laborious adjustment at the time of shipment from the factory is not required and the service personnel are not required to take the trouble to make an adjustment. Further, there exists an advantage in that the maximum performance at the state can be exhibited at all times without depending on an expensive apparatus.

That is, according to the above-mentioned environmental factors, by providing a control, in which complex factors are considered, to the high voltage output of a charging means in which a control fixed with respect to the changes in the environment is performed in the prior art, efficient, accurate control can be performed. Since the control quantity is determined on the basis of a plurality of parameters at that juncture, if an error occurs in some input data, a greater error can be prevented from occurring in the control quantity.

As has been described above, according to the present invention, in an picture image forming apparatus, such as a copier, a laser printer or the like, which varies greatly due to the environmental factors and changes with time, and controlled by an ambiguous relation between state quantities and control quantities, a control quantity can be calculated from many kinds of state quantities complexly related to each other, and the control of a process means can be performed according to environmental factors, original density, past performance or the like at that time. As a result, the control of latent image potential, a development bias or the like, can be automated and substantial manual labor can be eliminated. Control under which many kinds of state quantities are taken into consideration can be effected without performing a lot of preliminary experiments, although it is a simple program and an image having a stable quality can be provided at any time.

In addition, according to this embodiment, by representing the algorithm of an ambiguous control based on an experience of a human being in objective functions and rules, a high degree of automatic control of a process means close to the feeling of a human being can be effected.

Many widely different embodiments of the present invention can be made without departing from the spirit and scope thereof, therefore it is to be understood that this invention is not limited to the specific embodiments thereof except as defined in the appended claims.

TABLE 1

| | | Original Density | | |
|---|---|---|---|---|
| | | DL | DM | DH |
| Temperature | TL | PH | PH | PH |
| | TM | PM | PM | PM |
| | TH | PL | PL | PL |

TABLE 2

| | | Original Density | | |
|---|---|---|---|---|
| | | DL | DM | DH |
| Temperature | TL | IL | IL | IL |
| | TM | IM | IM | IM |
| | TH | IH | IH | IL |

TABLE 3

| | | Original Density | | |
|---|---|---|---|---|
| | | DL | DM | DH |
| Temperature | TL | SM | SL | SL |
| | TM | SH | SM | SM |
| | TH | SH | SH | SH |

TABLE 4

| | | | | |
|---|---|---|---|---|
| State | Room temperature | (T), | High | Low |
| Quantity | Humidity | (H) | High | Low |

TABLE 4-continued

| | | | | |
|---|---|---|---|---|
| | The accumulated number of copied sheets | (C) | Small | Large |
| Control Quantity | Post high-voltage output | | Decrease | Increase |

TABLE 5

| | | | | |
|---|---|---|---|---|
| State Quantity | Room temperature | (T) | Low | High |
| | Humidity | (H) | Low | High |
| | The accumulated number of copied sheets | (C) | Small | Large |
| | Original density | (D) | Low | High |
| | Thickness of paper | (P) | Thin | Thick |
| Control Quantity | Post high-voltage output | | Decrease | Increase |

TABLE 6

| | | | | |
|---|---|---|---|---|
| State Quantity | Room temperature | (T) | Low | High |
| | Humidity | (H) | Low | High |
| | The accumulated number of copied sheets | (C) | Small | Large |
| | Original density | (D) | High | Low |
| | Thickness of paper | (P) | Thick | Thin |
| Control Quantity | Separation high-voltage output | | Decrease | Increase |

What is claimed is:

1. An image forming apparatus using electrostatic images, comprising:
   - state quantity detection means for detecting states which would exert some influence on the formation of images as quantities;
   - control quantity control means for controlling an operation of a process for forming images on an image bearing member;
   - rule storage means for relating a relation between said state quantities and a control quantity by a control means as a certain rule and storing it; and
   - inference means for inferring a control quantity to be determined from a set of state quantities on the basis of rules of said rule storage means,
   - said picture image forming apparatus determines the operation quantity for the image bearing member of said process means on the basis of calculated results of said inference means and forms an image.

2. An image forming apparatus according to claim 1, wherein detection objects of said state detection means include humidity, temperature, an accumulated number of formed images, original density, potential of an image bearing member, quality of a transfer material, etc. and one or more of these are selected.

3. An image forming apparatus according to claim 1, wherein an electronic photography light-sensitive body and/or a transfer material is used as an image bearing member.

4. An image forming apparatus according to claim 1, wherein a process means in an exposure means and/or a development means.

5. An image forming apparatus according to claim 1, wherein a corona discharge means is used as a process means.

6. An image forming apparatus according to claim 5, wherein a corona discharge means is used for transfer, at latent image formation, and during between a development and a transfer process.

7. An image forming apparatus according to claim 1, wherein in the event that said process means to be controlled is a discharge means, an optical system or a development means, said rule storage means stores rules such that:
   - when original density is high, output from a discharge means or a grid bias voltage is made lower, or an exposure amount or a development bias voltage is made higher, and
   - when original density is low, output from a discharge means or a grid bias voltage is made higher, or an exposure amount or a development bias voltage is made lower.

8. An image forming apparatus according to claim 1, wherein in the event that said process means to be controlled is a discharge means, an optical system or a development means, said storage means stores rules such that:
   - when humidity and the number of formed images are high, output from a discharge means or a grid bias voltage is made higher, or an exposure amount or a development bias voltage is made higher, and
   - when humidity is low, output from the discharge means or a grid bias voltage is made lower, or an exposure amount or a development bias voltage is made medium.

9. An image forming apparatus according to claim 1, wherein said state quantity detection means detects at least any one of humidity, original density, and the number of formed images.

10. An image forming apparatus according to claim 1, wherein said control quantity control means controls at least any one of output from a charging means, a bias voltage to a grid by the charging means, an amount of exposure, a development bias voltage.

11. An image forming apparatus according to claim 1, wherein said state quantity detection means detects at least any one of room temperature, original density, the quality of a transfer material, humidity, and the number of formed images.

12. An image forming apparatus according to claim 11, wherein said control quantity control means controls output from the transfer means.

13. An image forming apparatus according to claim 11, wherein said control quantity control means controls the separation discharge means.

14. An image forming apparatus according to claim 11, wherein and object controlled by said control quantity control means is placed at the up-stream side of the transfer charging means when seen in a direction in which an image bearing member is moved and it is a charging means for charging the surface of an image bearing member after development.

15. An image forming apparatus according to claim 3, wherein the image bearing member of said image forming apparatus is an electronic photography light-sensitive body, and said apparatus has respective means for forming an electrostatic latent image on this light-sensitive body by charging and exposure, developing this latent image, and then transferring the developed image onto a transfer material.

16. An image forming apparatus, comprising:
   - an electronic photography light-sensitive body;
   - means for forming a latent image by exposing said light-sensitive body after the light-sensitive body is charged and making said latent image visible by supplying a development agent;
   - state quantity detection means for detecting the surface potential of a light-sensitive body or at least one state quantity for controlling a development bias voltage;

control quantity control means for controlling a surface potential of a light-sensitive body or a development bias voltage;

rule storage means for relating the relation between said state quantities and control quantities as a qualitative rule;

function storage means for representing said state quantities and control quantities by at least one fuzzy set; and inference means for calculating the degree belonging to the set of control quantities from the degree belonging to the set of state quantities in accordance with each rule and inferring the most highly probable control quantity, said image forming apparatus infers said control quantity by means of said inference means and controls.

17. An image forming apparatus having an electronic photography light-sensitive body, a latent image forming means for forming a latent image on the light-sensitive body, a development means for making visible a latent image formed by said latent image forming means, and a transfer means for transferring a visible image made visible by said development means onto a transfer material, comprising:

membership function storage means for storing membership functions in which state quantities and control quantities are each represented by a fuzzy set;

rule storage means for storing rules in which the relation between said state quantities and control quantities is represented by the form of a fuzzy rule;

state quantity detection means for detecting state quantities;

suitability calculation means for calculating the suitability of a state quantity detected by said state quantity detection means on the basis of the membership functions for the state quantities stored in said membership function storage means;

calculation means for determining inference results of each rule stored in said rule storage means by a predetermined calculation on the basis of the suitability calculated by said suitability calculation means;

inference means for calculating a control quantity on the basis of the inference results of each rule determined by said calculation means; and control means for controlling the transfer high voltage output of said transfer charger on the basis of the operation quantity calculated by said inference means.

* * * * *

UNITED STATES PATENT AND TRADEMARK OFFICE
CERTIFICATE OF CORRECTION

PATENT NO. : 5,029,314

DATED : July 2, 1991

INVENTOR(S) : Toru Katsumi, et al

It is certified that error appears in the above-identified patent and that said Letters Patent is hereby corrected as shown below:

On the title page:

IN [56] REFERENCES CITED

Attorney, Agent, or Firm: "Fitzpatrick, Cella Harper & Scinto" should read --Fitzpatrick, Cella, Harper & Scinto--.

COLUMN 1

Line 35, "humiditY" should read --humidity--.

COLUMN 2

Line 15, "low" should read --low level--.
Line 29, "a" (first occurrence) should read --an--.

COLUMN 3

Line 55, "a" should read --a charge--.

COLUMN 4

Line 4, "the" (first occurrence) should read --one--.
Line 6, ",embodiment" should read --embodiment--.
Line 21, "a" (second occurrence) should read --an--.
Line 37, "for detection" should be deleted.
Line 39, "a" should read --an--.
Line 66, "an" should read --a--.

COLUMN 5

Line 25, "is" should read --and is--.

UNITED STATES PATENT AND TRADEMARK OFFICE
CERTIFICATE OF CORRECTION

PATENT NO. : 5,029,314

DATED : July 2, 1991

INVENTOR(S) : Toru Katsumi, et al

It is certified that error appears in the above-identified patent and that said Letters Patent is hereby corrected as shown below:

COLUMN 6

Line 3, "HL" should read --HM--.
Line 12, "middle)" should read --medium)--.

COLUMN 7

Line 26, "sheets 3." should read --sheets ③.--.
Line 27, "voltage 4." should read --voltage ④.--.
Line 30, "1 to 3." should read --① to ③.-- and "quantity 4" should read --quantity ④--.
Line 33, "1 to 3." should read --① to ③.--.
Line 58, "the" should read --of the--.

COLUMN 8

Line 15, "vary," should read --vary, and--.
Line 25, "1 humid-" should read --① humid- --.
Line 26, "2 are" should read --②--.
Line 27, "is 3" should read --is ③--.
Line 28, "1 and 2" should read --① and ②--.
Line 31, "of 3." should read --of ③.--.
Line 59, "1 humidity" should read --① humidity--.
Line 60, "and 2" should read --and ②--.
Line 61, "is 3" should read --is ③--.
Line 62, "1 and 2" should read --① and ②--.
Line 64, "voltage 3" should read --voltage ③--.

COLUMN 9

Line 35, "sensor 813" should read --sensor 181--.
Line 68, "1 room" should read --① room--.

UNITED STATES PATENT AND TRADEMARK OFFICE
CERTIFICATE OF CORRECTION

PATENT NO. : 5,029,314

DATED : July 2, 1991

INVENTOR(S) : Toru Katsumi, et al

It is certified that error appears in the above-identified patent and that said Letters Patent is hereby corrected as shown below:

COLUMN 10

Line 1, "and 2" should read --and ②--.

COLUMN 11

Line 33, "control." should read --control,--.
Line 35, "below." should read --.--.
Line 37, "above" should be deleted.

COLUMN 12

Line 14, "an" should read --a--.

| | | |
|---|---|---|
| TABLE 2, "DH<br>IL<br>IM<br>IL" | should read | --DH<br>IH<br>IM<br>IL--. |

COLUMN 13

Line 57, "in" should read --is--.

UNITED STATES PATENT AND TRADEMARK OFFICE
CERTIFICATE OF CORRECTION

PATENT NO. : 5,029,314

DATED : July 2, 1991

INVENTOR(S) : Toru Katsumi, et al

It is certified that error appears in the above-identified patent and that said Letters Patent is hereby corrected as shown below:

COLUMN 14

Line 32, "a" should read --and a--.
Line 45, "and" should read --an--.
Line 46, "up-stream" should read --upstream--.

Signed and Sealed this

First Day of June, 1993

Attest:

Michael K. Kirk

MICHAEL K. KIRK

*Attesting Officer*

*Acting Commissioner of Patents and Trademarks*